United States Patent [15] 3,687,150
Hoglund [45] Aug. 29, 1972

[54] PROPORTIONAL FLUIDIC GAIN CHANGER

[72] Inventor: Michael J. Hoglund, Blaine, Minn.
[73] Assignee: Honeywell Inc., Minneapolis, Minn.

[22] Filed: Aug. 10, 1970
[21] Appl. No.: 62,246

[52] U.S. Cl. .......... 137/81.5
[51] Int. Cl. .......... F15c 1/14
[58] Field of Search .......... 137/81.5

[56] References Cited

UNITED STATES PATENTS 3,429,249 2/1969 Furlong .......... 137/81.5 X
3,568,698 3/1971 Bodwell .......... 137/81.5

*Primary Examiner*—William R. Cline
*Attorney*—Charles J. Ungemach and Ronald T. Reiling

[57] ABSTRACT

A fluid gain changer comprising two proportional fluid amplifiers. Fluid is supplied at oppositely varying pressures to an input port of the first amplifier and an input port of the second amplifier. In both amplifiers the input fluid along with a first biasing fluid and a second biasing fluid acts upon a fluid source. The circuit gain is changed by varying the first biasing fluid. The circuit output signal is produced between an outlet passage of the first amplifier and an outlet passage of the second amplifier.

2 Claims, 11 Drawing Figures

INVENTOR.
MICHAEL J. HOGLUND
BY Charles J. Ungemach
ATTORNEY

INVENTOR.
MICHAEL J. HOGLUND

BY Charles J. Ungemach
ATTORNEY

INVENTOR.
MICHAEL J. HOGLUND
BY Charles J. Ungemach
ATTORNEY

INVENTOR.
MICHAEL J. HOGLUND
BY Charles J. Ungemach
ATTORNEY

PROPORTIONAL FLUIDIC GAIN CHANGER

BACKGROUND OF THE INVENTION

This invention relates generally to fluid handling apparatus, and more specifically to pure fluid circuits having variable gain.

Fluid amplifiers and various other fluidic devices have been known in the art for some time. However, only recently has the fluidics art advanced to the point that complete systems utilizing fluid components are feasible. The recent interest in fluid systems design has increased the need for more flexible components and basic fluid circuits. Since many of the fluid systems of interest require means for changing system gain on command an increasing need exists for useable dynamic gain changers.

Various solutions to the problem of changing gain have previously been proposed, all of which have undesirable features. For example, a plurality of fluid amplifiers each having different gain characteristics may be used in conjunction with switching means for selecting the desired amplifier. This technique is cumbersome, expensive, and introduces undesirable time delays into the circuit in which it is used. Similarly, a special fluid amplifier having a plurality of pairs of receivers of different gain characteristics and means for deflecting the power stream to the desired receiver pair may be used. This requires a special amplifier which is expensive and difficult to manufacture. Another prior art gain changing technique involves the use of a special fluid amplifier having an interaction chamber with a special port or ports through which additional fluid may be introduced. The gain of the amplifier is changed by supplying additional fluid to its interaction chamber. However, this technique cannot produce noise-free output signals at very low gains.

It is apparent that these prior art gain changers are not generally satisfactory for use in modern refined fluid systems.

An improvement over this prior art is found in U.S. Pat. No. 3,499,460, entitled FLUID CIRCUIT and assigned to the assignee of the present invention. It shows the recovery fluid of a first amplifier being supplied to second and third amplifiers where it is acted upon by a single biasing fluid. The present invention is a significant improvement over Pat. No. 3,499,460. The present invention utilizes two biasing fluids which along with the recovery fluid from the first amplifier act upon an independent power source fluid. Since all amplifiers operate at full power better environmental characteristics can be achieved so that the maximum gain is ten times greater than the apparatus of Pat. No. 3,499,460, and the present invention is able to function extremely well at elevated temperatures. Also the subject invention has a signal-to-noise ratio an order of magnitude better than that of Pat. No. 3,499,460.

SUMMARY OF THE INVENTION

The applicant's fluidic gain changer circuit overcomes the problems of the prior art devices. In accordance with the teachings of this invention, the basic gain changing operation is accomplished with two general purpose proportional fluid amplifiers. The circuit input is a fluidic pressure differential applied to control ports in the proportional fluid amplifiers. At both amplifiers, the input fluid along with first and second bias pressures at control ports of the amplifiers, acts upon a fluid source. When the first bias pressure is held at a constant value, chosen to optimize the initial gain, the gain of the circuit is thereafter changed by varying the magnitude of the second bias pressure. The circuit output is a pressure differential signal produced between non-corresponding outlet channels of the first and second amplifiers.

DESCRIPTION OF THE PREFERRED EMBODIMENTS

Figure 1:
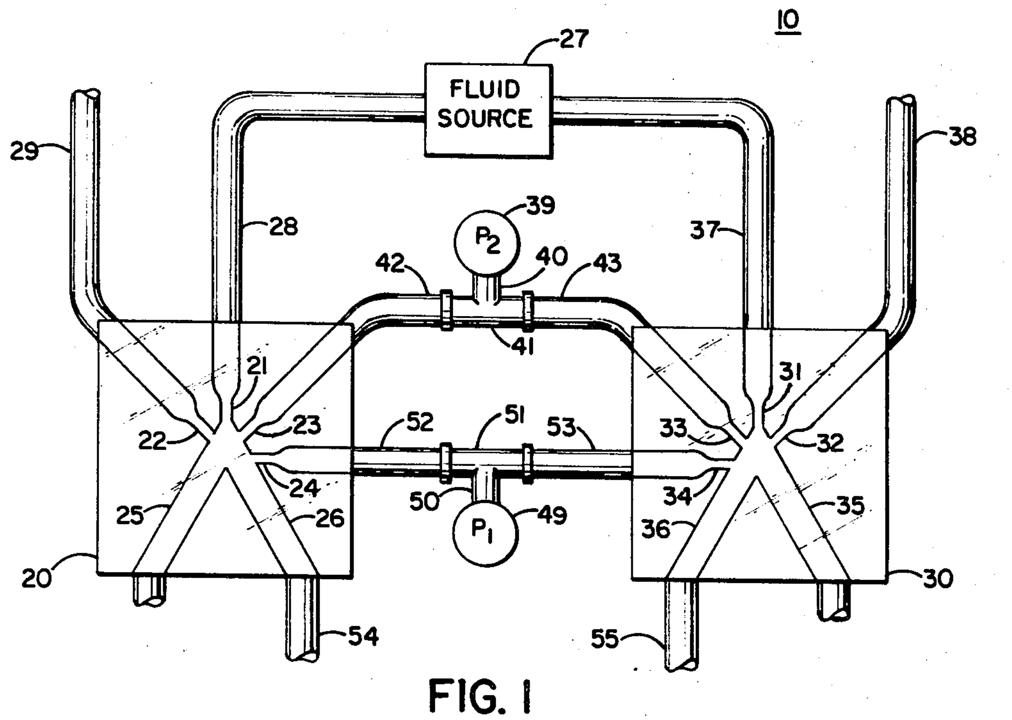
FIG. 1 is a schematic drawing of an embodiment of the fluid gain changing circuit.

In FIG. 1, reference numeral 10 generally refers to one embodiment of the dynamic gain changer. Reference numeral 20 refers to a first proportional fluid amplifier having a power nozzle 21, a first control port 22, a second control port 23, a third control port 24, a first outlet passage 25, and a second outlet passage 26. Power nozzle 21 is supplied with fluid under pressure from a fluid source 27 by means of a conduit 28. A fluid pressure signal is provided to control port 22 from any desired source by means of a conduit 29.

Reference numeral 30 refers to a second proportional fluid amplifier having substantially the same geometry as amplifier 20. Amplifier 30 has a power nozzle 31, a first control port 32, a second control port 33, a third control port 34, a first outlet passage 35, and a second outlet passage 36. Power nozzle 31 is supplied with fluid under pressure from the fluid source 27 by means of a conduit 37. A fluid pressure signal is provided to control port 32 from any desired source by means of a conduit 38.

Figure 11:
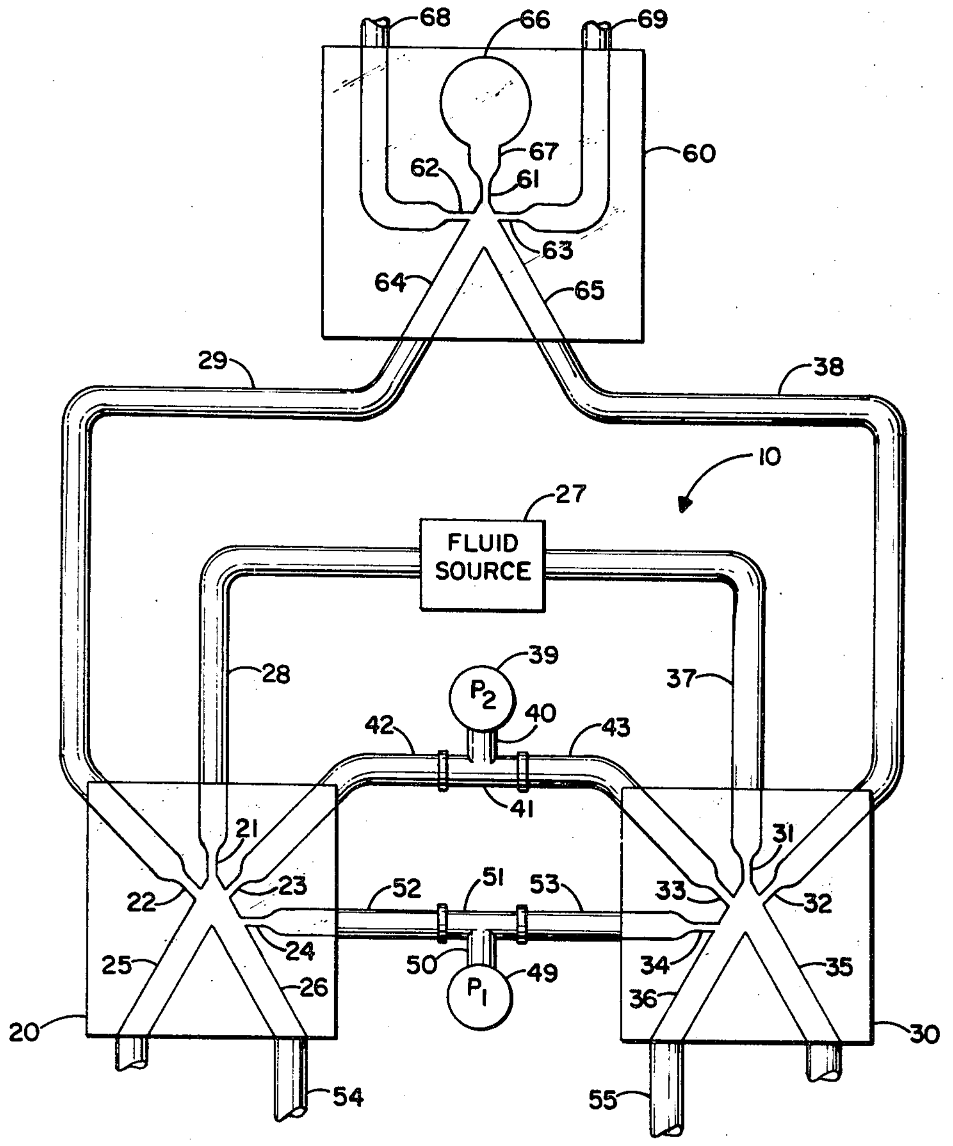
FIG. 11 is a schematic drawing of a fluid amplifier which may be used to supply the input signal to the gain changing circuit of FIG. 1.

The fluid pressure signal input is a pressure differential between conduit 29 of amplifier 20 and conduit 38 of amplifier 30 and may be supplied by the fluid amplifier shown in FIG. 11.

Control port 23 of amplifier 20 and control port 33 of amplifier 30 are connected to a fluid bias source 39 supplying fluid at a fixed pressure $P_2$ by means of a conduit 40, a T junction 41, and conduits 42 and 43 respectively. Control port 24 of amplifier 20 and control port 34 of amplifier 30 are connected to a fluid bias source 49 supplying fluid at a variable pressure $P_1$ by means of a conduit 50, a T junction 51, and conduits 52 and 53 respectively.

Output pressure differential signals from circuit 10 are produced between outlet passage 26 of amplifier 20 and the non-corresponding outlet passage 36 of amplifier 30. The circuit output signals are transmitted to any desired utilization device (not shown) by means of conduits 54 and 55.

The gain of a fluidic device or circuit as defined as the ratio of the differential change in the output signal to the differential change in the input signal. There are three different gains which may be considered: (1) pressure gain, (2) flow gain, and (3) power gain. For the purpose of the following discussion, only the pressure gain will be considered. It should be understood, however, that the following discussion is equally applicable when considering flow gain or power gain. The pressure gain of the subject gain changer circuit is defined as the ratio of a change in the output pressure differential to the corresponding change in the input pressure differential or the slope of the input-output pressure curve.

Referring to FIG. 1 and the operation of circuit 10, amplifiers 20 and 30 are chosen to have substantially identical geometries so that they will have substantially equal fluid characteristics. Power nozzles 21 and 31 are both supplied with fluid from the fluid source 27 so as to have substantially equal pressure applied thereto. Control ports 23 and 33 are connected to the same fluid bias source 39 and are therefore supplied with the same pressure $P_2$. Control ports 24 and 34 are connected to the same fluid bias source 49 and are therefore supplied with the same pressure $P_1$. Due to the substantially identical geometries of amplifiers 20 and 30, and the equal supply and bias pressures being applied thereto, the stream issuing from power nozzle 21 will tend to divide between outlet channels 25 and 26 in substantially the same proportion as the stream from power nozzle 31 divides between outlet passages 35 and 36. It can be seen that in the absence of a pressure differential input signal between control port 22 of amplifier 20 and control port 32 of amplifier 30, there will be no pressure differential signal from circuit 10.

If, however, an input signal is applied to circuit 10 an output signal is obtained. Assume that higher pressure fluid is supplied to amplifier 20 at control port 22 than is supplied to amplifier 30 at control port 32. Fluid will then be deflected toward channel 26 more easily than toward channel 36 and thus fluid will flow from channel 26 at a higher pressure than from channel 36. Thus, when a pressure differential signal is supplied to circuit 10 a pressure differential signal will be provided therefrom and the gain of the circuit in the absence of bias signals would depend on the characteristics of amplifiers 20 and 30.

Considering any given set of input conditions to circuit 10, the maximum pressure signal in outlet channel 26 will occur when the stream issuing from power nozzle 21 is deflected directly into outlet channel 26. Likewise, the maximum pressure signal in outlet channel 36 will occur when the stream issuing from power nozzle 31 is deflected directly into outlet channel 36. The streams issuing from power nozzles 21 and 31 can be directed toward outlet channels 26 and 36 respectively by decreasing the biasing pressure to control ports 23 and 24 of amplifier 20 and control ports 33 and 34 of amplifier 30.

Figure 2:
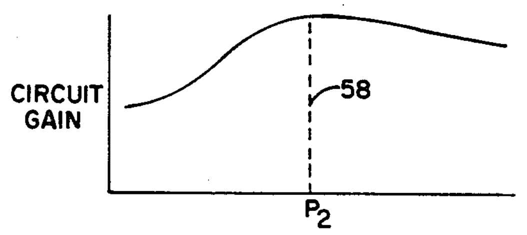
FIG. 2 shows the circuit gain as a function of the fixed bias pressure $P_2$ when variable bias pressure $P_1$ is equal to zero.

For a given fixed pressure $P_2$ at control ports 23 and 33, an increase in the variable pressure $P_1$ at control ports 24 and 34 will cause the streams from power nozzles 21 and 31 to shift away from outlet channels 26 and 36. The result is that the pressures of the fluid signals in both outlet channels 26 and 36 will decrease and the pressure differential between outlet channels 26 and 36 will decrease. Correspondingly, the circuit gain will decrease. The circuit gain can be reduced to near zero by sufficiently increasing the variable pressure $P_1$ at control ports 24 and 34. In FIG. 2, it can be seen that when the variable pressure $P_1$ is made zero, there can be found a value of fixed pressure $P_2$ shown by dashed line 58 which will yield the maximum circuit gain. Generally, the circuit will be operated at this value of $P_2$. However, it is to be noted that the circuit could also be operated by applying other values of pressure $P_2$ at control ports 23 and 33 including zero pressure.

The basic gain changing technique can be illustrated by examining amplifier 20 and amplifier 30 more closely. The $\Delta P$ input is the pressure differential between conduit 29 of amplifier 20 and conduit 38 of amplifier 30. The pressure in conduit 29 and conduit 38 may be designated as $f(\Delta P \text{ input})$. The circuit output is the pressure differential between passage 26 of amplifier 20 and passage 36 of amplifier 30. The pressure in passage 26, which is the single ended output of amplifier 20 will be designated $P_{020}$, and the pressure in passage 36, which is the single ended output of amplifier 30, will be designated as $P_{030}$.

Figure 3:
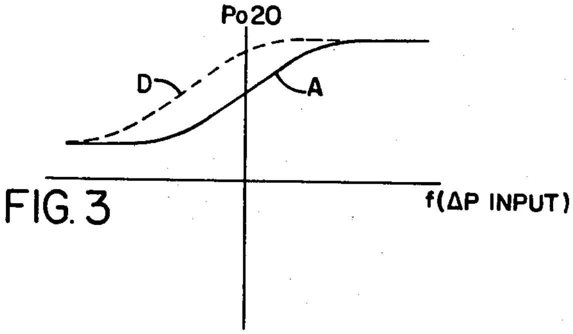
FIG. 3 shows the output as a function of input for a single amplifier.
Figure 4:
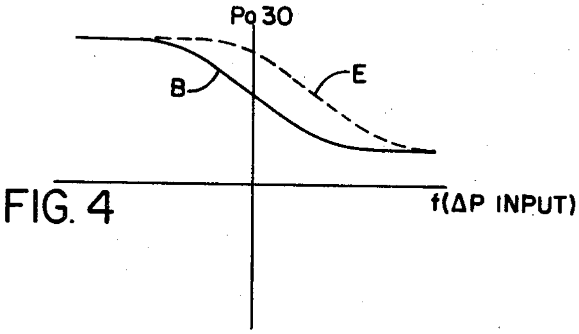
FIG. 4 shows the output as a function of input for another amplifier.
Figure 5:
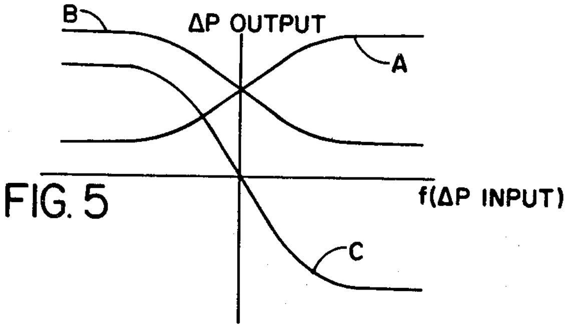
FIG. 5 shows FIGS. 3 and 4 superimposed and subtracted in order to arrive at the circuit output as a function of input.

Referring to FIG. 3, curve A represents the single ended output pressure $P_{020}$ as a function of $f(\Delta P \text{ input})$. In FIG. 4, the single ended output pressure $P_{030}$ is shown as a function of $f(\Delta P \text{ input})$. Curves A and B are seen to be similar in shape but in opposite sense. This is because an increase of input to amplifier 20 is accompanied by a decrease of input to amplifier 30 and vice versa. The circuit output, the pressure differential between the single ended outputs $P_{020}$ and $P_{030}$ and designated $\Delta P_0$, can be found graphically by subtracting $P_{030}$ from $P_{020}$. FIG. 5 shows a graph of the single ended output curves A and B OF FIGS. 3 and 4 superimposed on the $\Delta P$ output as a function of $f(\Delta P$ input) axis. By subtracting the curves, curve C is generated, which is the $\Delta P$ output signal as a function of $f(\Delta P \text{ input})$. The slope of this line represents the circuit gain.

Figure 6:
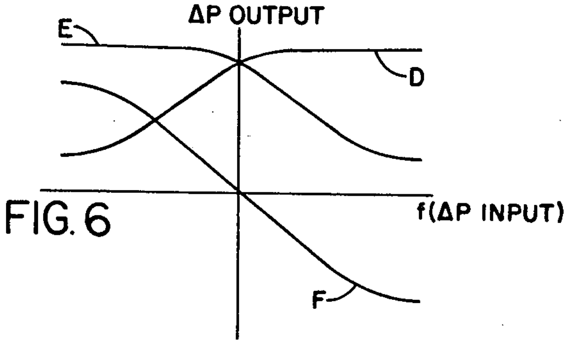
FIG. 6 shows another superimposition of amplifier input as a function of output curves in order to arrive at the circuit output as a function of input.

Referring again to FIG. 3, curve D represents a curve having a different bias pressure than exists with respect to curve A. It can be seen that varying a bias pressure has the effect of shifting the single ended output curve. The purpose of biasing pressure $P_2$ is to shift the single ended output curves such that they intersect each other at their maximum gain. When this is accomplished the $\Delta P$ output as a function of $f(\Delta P \text{ input})$ will have a maximum gain. With fixed pressure $P_2$ constant and the circuit prepared to operate at maximum gain, the circuit can further be varied by changing variable pressure $P_1$. An increase in variable pressure $P_1$ will shift curve A to, for example, curve D and shift curve B to, for example, curve E. FIG. 6 shows these curves superimposed on the ΔP output as a function of $f$(ΔP input) axis. Once again, by subtracting the $P_{020}$ and $P_{030}$ curves, the curve F is generated, which represents the ΔP output as a function of $f$(ΔP input). It can be seen that curve F has a lower gain than curve C since its slope is less.

Figure 7:
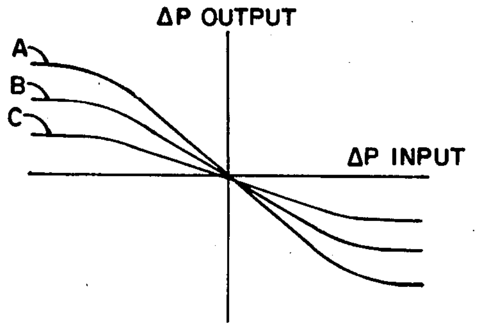
FIG. 7 shows a plurality of curves illustrating representative circuit output signals as a function of input signals under various biasing conditions.

In FIG. 7, curves A, B, and C represent typical output as a function of input relationships for the dynamic gain changer. The input signal, designated ΔP input, is a pressure differential applied between control port 22 of amplifier 20 and control port 32 of amplifier 30, and is represented by the distance from the ordinate axis in FIG. 7. The output signal designated ΔP output is a pressure differential produced between outlet passages 26 and 36 of amplifiers 20 and 30 respectively and is represented by a distance from the abscissa axis. For a given fixed pressure $P_2$, FIG. 7 represents possible curves for different variable pressures $P_1$. A change from curve A to curve B represents an increase in pressure $P_1$. The maximum gain of the dynamic gain changer results when the variable pressure $P_1$ is equal to zero. This gain can be represented by the slope of curve A. The minimum gain of the dynamic gain changer results when the variable pressure $P_1$ is of sufficient magnitude to direct substantially the entire power stream from nozzles 21 and 31 of amplifiers 20 and 30 respectively away from outlet passages 26 and 36 of amplifiers 20 and 30 respectively and toward outlet passages 25 and 35. This gain can be represented by a line nearly coinciding with the abscissa axis. Further, the gain may assume any intermediate value such as can be represented by the slope of curves B and C by providing a variable pressure $P_1$ at control ports 24 and 34 of amplifiers 20 and 30 respectively which has the proper value relative to the fixed pressure $P_2$ at control ports 23 and 33 of amplifiers 20 and 30.

Referring now to FIG. 11, reference numeral 60 generally indicates an additional proportional fluid amplifier which is interconnected with circuit 10 to supply the input signal thereto. Proportional fluid amplifier 60 has a power nozzle 61, a first control port 62, a second control port 63, a first outlet passage 64, and a second outlet passage 65. Power nozzle 61 is supplied with fluid under pressure from a fluid source 66 by means of a conduit 67. A pair of conduits 68 and 69 are connected to a differential fluid source (not shown) and are connected to the control ports 62 and 63 respectively to supply a pressure differential input signal thereto. The outlet passages 64 and 65 are connected to the conduits 29 and 38 of FIG. 1 to supply the input signal to the gain changer circuit 10.

In the operation of FIG. 11, fluid from fluid source 66 issues as a stream from power nozzle 61. In the absence of a pressure differential between control ports 62 and 63, the fluid stream from nozzle 61 will divide substantially equally between outlet passages 64 and 65 resulting in fluid being supplied to control ports 22 and 32 of amplifiers 20 and 30 of FIG. 1 respectively at substantially equal pressures. As described in the operation of FIG. 1, in the absence of a pressure differential signal between control port 22 of amplifier 20 and control port 32 of amplifier 30, there will be no pressure differential output signal from circuit 10.

If, however, an input signal is applied to the circuit of FIG. 11 such that the pressure is greater at control port 63 than at control port 62, the fluid stream issuing from nozzle 61 will be deflected such that the larger portion thereof enters outlet passage 64. As a result, a higher pressure fluid is supplied to control port 22 of amplifier 20 than is supplied to control port 32 of amplifier 30. As explained in the operation of FIG. 1, fluid will then flow from channel 26 at a higher pressure than from channel 36. Thus, a pressure differential signal will be provided across conduit 26 and conduit 36 and a circuit gain is provided.

Of course, it will be understood that the apparatus of FIG. 11 is a preferred source and that other apparatus for supplying a pressure differential signal input to the circuit 10 of FIG. 1 may be employed.

Figure 8:
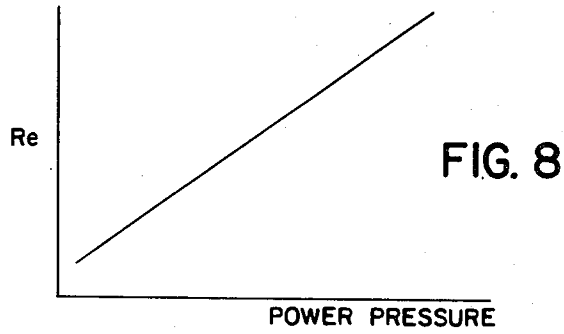
FIG. 8 shows the fluid Reynolds number as a function of amplifier power pressure.
Figure 9:
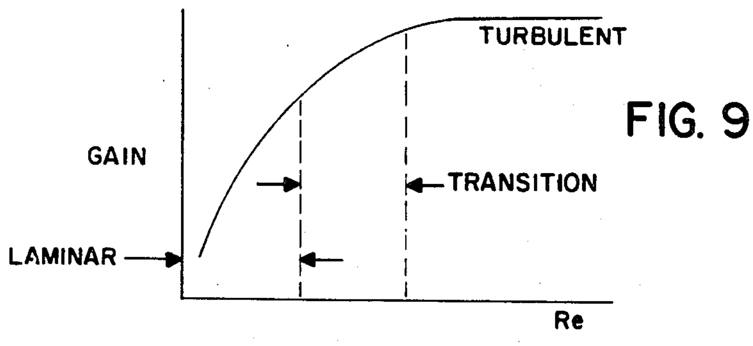
FIG. 9 shows the circuit gain as a function of fluid Reynolds number.
Figure 10:
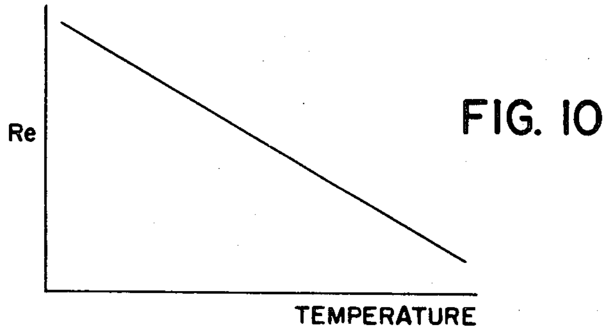
FIG. 10 shows the fluid Reynolds number as a function of ambient temperature.

FIGS. 8, 9, and 10 show curves which illustrate the circuit operation and the superiority of the subject gain changer over a number of prior art gain changers. FIG. 8 shows that the fluid Reynolds number varies directly with the fluid pressure. FIG. 9 shows that in order to have a high and constant circuit gain the circuit must be operating at a high Reynolds number in order that the fluid flow is turbulent. As alluded to earlier, Pat. No. 3,499,460 shows the recovery fluid of a first amplifier being supplied to second and third amplifiers where it is acted upon by a biasing fluid. Since there is a 60 to 65 percent power loss in amplifiers, the fluid which came into the first amplifier is of diminished power when it reaches the second and third amplifiers. The subject invention contains an independent power supply at the two basic gain changing amplifiers so that the fluid flow will be turbulent and consequently be able to achieve high circuit gain. Thus, by using the recovery fluid from the first amplifier to act upon an independent power source at the two gain changing amplifiers, there is eliminated the effect of the power loss in the first amplifier's interaction chamber, and the second and third amplifiers then operate with turbulent fluid flow and higher gain is achieved. Also, it has been found that the prior art gain changers were not able to operate at elevated temperatures. FIG. 10 illustrates that the Reynolds number varies inversely with temperature such that at high temperatures the Reynolds number will be quite low. Referring to FIG. 9, it can be seen that the high temperature and low Reynolds number will then generate a low circuit gain. The failure of prior art devices to function at elevated temperatures is an extremely important limitation. The present invention overcomes this drawback by operating with high power pressures. Although an increase in temperature tends to decrease the Reynolds number as illustrated in FIG. 10, the high power pressure will tend to increase the Reynolds number so that the effect of high temperature can be overcome and the fluid flow can be turbulent so that the circuit gain can be high. Also, the high gain and range will decrease the effect of noise and create a more acceptable signal-to-noise ratio.

Many modifications, variations, and embodiments are possible within the scope of this invention. For example, the biasing supply pressure $P_2$ may be eliminated if the amplifier characteristics are well chosen or if less than maximum gain is necessary. Likewise alternate means for supplying the differential input pressure may be employed. Other variations will occur to those skilled in the art. It is, therefore, understood that the particular embodiment shown here is for illustration purposes only, and that the present invention is limited only by the scope of the appended claims.

I claim as my invention:

1. A fluidic dynamic gain changer comprising:

first proportional amplifier means having a power nozzle for receiving fluid from a fluid source, a first control port, a second control port, a third control port, and first and second outlet passages;

second proportional fluid amplifier means having a power nozzle for receiving fluid from a fluid source, a first control port, a second control port, a third control port, and first and second outlet passages;

said first, second and third control ports of the first and second proportional amplifiers having the same orientation with respect to the first and second power nozzles;

input means for supplying an input differential pressure signal to the first control port of said first amplifier and the first control port of said second amplifier;

pressure biasing means connected to the second control port of said first amplifier and the second control port of said second amplifier for supplying fluid thereto at a common fixed pressure; and pressure biasing means connected to the third control port of said first amplifier and the third control port of said second amplifier for supplying fluid thereto at a common variable pressure, whereby a fluid output signal is produced between the second outlet passage of said first amplifier and the second outlet passage of said second amplifier, the magnitude of the fluid output signal being dependent upon the differential pressure supplied by said input means, the pressure from said fluid source, said fixed pressure, and said variable pressure.

2. A fluid dynamic gain changer comprising:

first proportional fluid amplifier means having a power nozzle, first and second control ports, and first and second output passages;

input means for supplying an input differential pressure to said first and second control ports;

second proportional fluid amplifier means having a power nozzle for receiving fluid from a fluid source, a first control port, a second control port, a third control port, and first and second outlet passages;

means connecting the first outlet passage of said first amplifier to the first control port of said second amplifier;

third proportional fluid amplifier means having a power nozzle, for receiving fluid from a fluid source, a first control port, a second control port, a third control port, and first and second outlet passages;

said first, second and third control ports of the second and third proportional amplifiers having the same orientation with respect to the second and third power nozzles;

means connecting the second outlet passage of said first amplifier to the first control port of said third amplifier;

pressure biasing means connected to the second control port of said second amplifier and the second control port of said third amplifier for supplying fluid thereto at a common fixed pressure; and pressure biasing means connected to the third control port of said second amplifier and the third control port of said third amplifier for supplying fluid thereto at a common variable pressure, whereby a fluid output signal is produced between the second outlet passage of said second amplifier and the second outlet passage of said third amplifier, the magnitude of the fluid output signal being dependent upon the differential pressure supplied to the control ports of said first amplifier, the pressure from said fluid source, said fixed pressure, and said variable pressure.

* * * * *